United States Patent
Yassan et al.

(10) Patent No.: US 11,435,246 B2
(45) Date of Patent: Sep. 6, 2022

(54) LIGHT ELECTRIC VEHICLE BRAKE INSPECTION DEVICE

(71) Applicant: NEUTRON HOLDINGS, INC., San Francisco, CA (US)

(72) Inventors: Mohammadreza Yassan, San Francisco, CA (US); John Bogler, Long Beach, CA (US)

(73) Assignee: Neutron Holdings, Inc., San Francisco, CA (US)

( * ) Notice: Subject to any disclaimer, the term of this patent is extended or adjusted under 35 U.S.C. 154(b) by 0 days.

(21) Appl. No.: 17/230,697

(22) Filed: Apr. 14, 2021

(65) Prior Publication Data

US 2021/0325269 A1    Oct. 21, 2021

Related U.S. Application Data

(60) Provisional application No. 63/010,407, filed on Apr. 15, 2020.

(51) Int. Cl.
*G01L 5/22*    (2006.01)
*G01L 5/28*    (2006.01)
*B60T 17/22*   (2006.01)

(52) U.S. Cl.
CPC .............. *G01L 5/22* (2013.01); *B60T 17/221* (2013.01); *G01L 5/28* (2013.01)

(58) Field of Classification Search
CPC . G01L 5/22; G01L 5/28; B60T 17/221; B60T 7/085; F16D 66/023; G01M 17/007
See application file for complete search history.

(56) References Cited

U.S. PATENT DOCUMENTS

| | | | |
|---|---|---|---|
| 6,431,302 B2 * | 8/2002 | Patmont | B62K 3/002 180/181 |
| 7,729,822 B2 * | 6/2010 | Le Gars | G07B 15/02 340/432 |
| 2002/0005309 A1 | 1/2002 | Patmont et al. | |
| 2007/0158949 A1 | 7/2007 | Le Gars et al. | |

FOREIGN PATENT DOCUMENTS

| | | |
|---|---|---|
| DE | 20214041 U1 | 2/2004 |
| GB | 2036986 A | 7/1980 |

* cited by examiner

*Primary Examiner* — Freddie Kirkland, III
(74) *Attorney, Agent, or Firm* — Dentons US LLP

(57) ABSTRACT

The present application describes a portable or stationary light electric vehicle brake inspection device that may be used to check the brake system of a light electric vehicle. The light electric vehicle brake inspection device helps manufacturing staff or technicians take the guesswork out of determining whether the brake system of the light electric vehicle is operating as expected. Additionally, the light electric vehicle brake inspection device can remove or minimize brake check inconsistencies across a manufacturing and maintenance team as the light electric vehicle brake inspection device described herein can consistently produce light electric vehicle brake systems and run the same test on a brake system across an entire fleet of light electric vehicles during their manufacturing or field operation processes.

15 Claims, 8 Drawing Sheets

LIGHT ELECTRIC VEHICLE BRAKE INSPECTION DEVICE

CROSS-REFERENCE TO RELATED APPLICATIONS

This patent application claims a benefit of U.S. Provisional Patent Application No. 63/010,407 filed on Apr. 15, 2020, which is herein incorporated by reference for all purposes.

BACKGROUND

Providers of ridesharing platforms offer various transportation methods to enable individuals to reach a desired destination from their point of origin. In some cases, the ridesharing platform providers provide electric scooters and/or electric bikes that individuals can reserve and use for a period of time. However, due to the sheer number of electric bikes and electric scooters, it is time consuming to perform maintenance on these electric vehicles.

SUMMARY

The present application describes a light electric vehicle brake inspection device that may be used to check a brake system of a light electric vehicle (e.g., an electric scooter, an electric bicycle, etc.). The light electric vehicle brake inspection device helps technicians take the guesswork out of determining whether the brake system of the light electric vehicle is operating correctly and as expected. Additionally, the light electric vehicle brake inspection device can remove or minimize brake check inconsistencies across a maintenance team as the light electric vehicle brake inspection device described herein can consistently run the same test on a brake system across an entire fleet of light electric vehicles. The light electric vehicle brake inspection device can also be configured to tailor its brake inspection process to each individual light electric vehicle to account for age, manufacturing tolerances, manufacturing type and so on.

Accordingly, described herein is a method for checking a brake system of a light electric vehicle using a light electric vehicle brake inspection device. In some examples, the method comprises receiving, via a receptacle defined by a housing of the light electric vehicle brake inspection device, at least a portion of a handlebar of the light electric vehicle and a brake lever of the light electric vehicle. The light electric vehicle brake inspection device may be used to actuate the brake lever to a first distance from a datum. The light electric vehicle brake inspection device may then measure an amount of force applied to the brake lever as the brake lever is displaced to the first distance. The light electric vehicle brake inspection device may also determine, based at least in part on a comparison of the amount of force to an expected amount of force, an operating status of the brake system of the light electric vehicle.

The present disclosure also describes a light electric vehicle brake inspection device. In some examples, the light electric vehicle brake inspection device comprises a processor and a memory for storing information associated with a light electric vehicle. The light electric vehicle brake inspection device may also include a housing that defines an opening for receiving a handlebar and brake lever of the light electric vehicle. The light electric vehicle brake inspection device may also include a motor that activates a sliding mechanism to actuate the brake lever to a first distance from a datum. The light electric vehicle brake inspection device may also include a load cell that measures an amount of force applied to the brake lever as the brake lever is displaced to the first distance. The amount of force applied to the brake lever may then be compared (e.g., by the processor) to an expected amount of force to determine the operating status of the brake system of the light electric vehicle.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
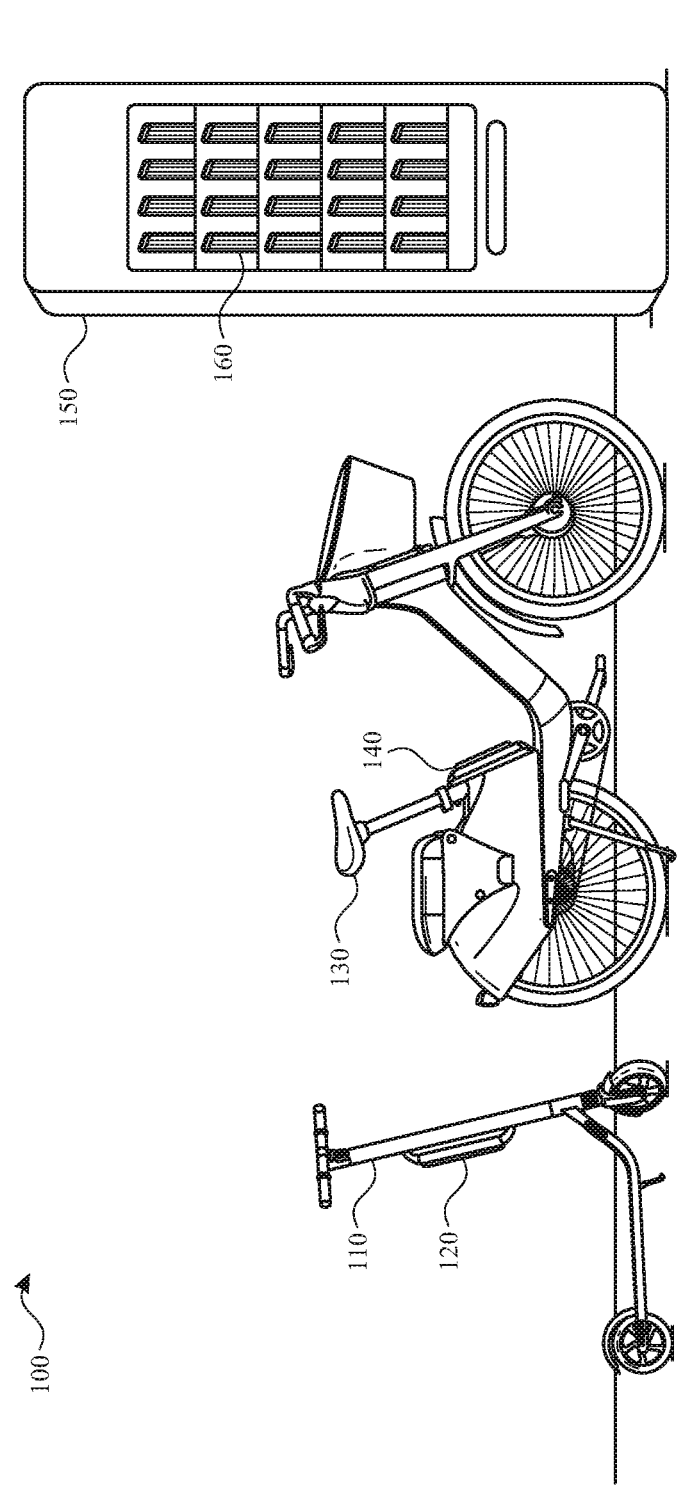
FIG. 1 illustrates an example environment in which light electric vehicles are made available for reservation and use according to one or more examples.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Electric ridesharing vehicles, such as electric assist bicycles and electric scooters (also referred to herein as "light electric vehicles"), are widely used to transport individuals from various origins to various destinations. These light electric vehicles are typically provided by, or are otherwise associated with, a provider of a ridesharing platform. The providers of ridesharing platforms are also responsible for maintaining the light electric vehicles and ensuring the light electric vehicles are operating as expected. This includes checking the various systems of the light electric vehicle to help ensure the safety of individuals that reserve and ride these light electric vehicles.

The braking system of a light electric vehicle is a system that must be maintained properly to help ensure the safety of riders. For example, light electric vehicles can reach speeds of up to fifteen miles per hour or more. As such, it is important to accurately determine whether a brake system of the light electric vehicle is functional and operating as expected.

Typically, a technician may perform an inspection of the brake system of the light electric vehicle. This may include a visual inspection of the various components of the brake system. For example, the technician may visually inspect a brake lever of the light electric vehicle, a brake pad of the light electric vehicle, a brake cable of the light electric vehicle, a brake caliper of the light electric vehicle and so on.

In addition to a visual inspection of the various components of the brake system, the technician may also take other actions to determine whether the brake system of the light electric vehicle is operating as expected. One technique to test the functionality of one or more brakes of the brake system is to have the technician actuate the brake lever by hand and determine, based on the movement of the brake lever, whether the brake system is operating as expected.

For example, once actuated, if the brake lever is close to a handlebar of the light electric vehicle such that the technician cannot pass a finger between the brake lever and the handlebar (e.g., the brake lever is closer than a finger width to the handlebar), the technician may determine that the brake system does not comply with normal/expected operating parameters (e.g., the brake is too loose).

The rider of the light electric vehicle may be harmed if the brake system of the light electric vehicle is operating outside of the normal/expected operating parameters. For example, if the braking force is too low, the light electric vehicle may not slow down or stop as expected/anticipated when the rider actuates the brake lever. Likewise, if the braking force is too high, the rider may stop too suddenly. In either case, the rider may crash the light electric vehicle and suffer an injury.

As one can expect, the visual brake inspection and/or manual brake lever actuation process described above has various flaws. For example, during a visual inspection, each technician may place an emphasis on different criteria and/or notice different things about the brake system. Likewise, different technicians may have different finger widths and/or may squeeze or otherwise actuate a brake lever with different amounts of force. Additionally, a technician's hand may become tired after manually actuating numerous brake levers. As such, the travel distance of an actuated brake lever may not be consistent or accurately measured across different light electric vehicles and/or over time.

Accordingly, the present disclosure describes a light electric vehicle brake inspection device that may be used by a technician (or other individual) to accurately check a brake system of a light electric vehicle. Although a brake system of a light electric vehicle is specifically mentioned, the light electric vehicle brake inspection device may be used for any type of bicycle, scooter or other wheeled vehicle that has a mechanical braking system.

In some examples, the light electric vehicle brake inspection device may include one or more input mechanisms. The input mechanisms may be used by the technician to provide identification information of the light electric vehicle to the light electric vehicle brake inspection device. The identification information may be used to correlate the results of the brake system inspection process to the particular light electric vehicle. The light electric vehicle brake inspection device may also include a display and/or other output mechanisms that display information about the results of the brake system inspection process (e.g., whether the brake system of the light electric vehicle passed or failed the brake system inspection process).

The light electric vehicle brake inspection device may also include a housing that defines an opening or other receptacle that receives a handlebar and brake and lever of the light electric vehicle. Once the handlebar and brake lever have been received into the opening, a sliding mechanism, actuated by a motor, actuates the brake lever to a first distance from a datum. A load cell may measure an amount of force applied to the brake lever as the brake lever is displaced the first distance.

The light electric vehicle brake inspection device may then compare the amount of force to an expected amount of force to determine whether the brake system of the light electric vehicle is operating within expected operating parameters. For example, for every X newton(s) of force that is applied to the brake lever when the brake lever has been actuated by the sliding mechanism and motor, Y newton(s) of opposing force should be detected by the load cell. If Y newton(s) of opposing force is not detected, it may be determined that the brake system is not operating within expected/required operating parameters. However, if Y newton(s) of opposing force is detected, it may be determined that the brake system is operating within expected/required operating parameters.

In some examples, the amount of opposing force may be measured at different brake lever displacement distances. For example, a first measurement may be taken once the brake lever travels a first distance from the datum and a second measurement may be taken once the brake lever travels a second distance from the datum. Thus, the light electric vehicle brake inspection device may be able to accurately check the maximum braking force of the brake system of the light electric vehicle.

These and other examples will be shown and described with reference to FIGS. 1-7 below.

FIG. 1 illustrates an example environment 100 in which aspects of the present disclosure may be practiced. As illustrated, environment 100 includes an electric scooter(s) 110, an electric bicycle(s) 130, and a rechargeable battery kiosk(s) 150. It will be appreciated that the electric scooter 110 and the electric bicycle 130 are provided as example light electric vehicles and that, in other examples, aspects described herein apply to other types of light electric vehicles.

As described herein, the environment 100 includes a network service that receives information from the electric scooter 110 and/or the electric bicycle 130 (also referred to herein as light electric vehicles) over a network communication channel (e.g., one or more networks, the Internet, etc.). The information enables an individual, using a client application executing on a computing device, to locate, request, and/or reserve (e.g., rent or borrow for a duration of time) one or more light electric vehicles.

In some examples, the network service includes one or more computing systems or servers that are remote from the computing device of the individual and the light electric vehicles. The one or more computing systems includes an application programming interface (API) that enables the one or more computing systems to receive information from, send information to, and otherwise interact with the computing device, the light electric vehicles 110, 130 and/or the rechargeable battery kiosk(s) 150.

For example, the client application executing on the computing device of the individual receives, from the network service over the network communication channel, information about a location of one or more of the light electric vehicles. The location of each of the light electric vehicles can then be provided on a user interface of the client application.

In one example, the user interface of the client application includes a map that displays a determined location of the individual and/or a determined location of the light electric vehicles. In some examples, the determined location of the individual and/or the determined location of the light electric vehicles is based, at least in part, on Global Positioning System (GPS) data (or other location information) received by the network service over the network communication channel.

The user interface of the client application displays the location information of the individual and the light electric vehicles as different icons (or other such visual representations). Once the location information is displayed, the individual may select an icon representing a type of light electric vehicle (e.g., an icon for an electric scooter 110 or an icon for an electric bicycle 130). The user interface of the client application then generates or determines a route (e.g., provides directions) from the individual's current location to the selected light electric vehicle. Selection of one of the icons may also enable the individual to reserve (e.g., place a hold on) the light electric vehicle (to ensure that the light electric vehicle will be at the determined location when the individual arrives), rent the light electric vehicle and/or borrow the light electric vehicle for a period of time.

Each light electric vehicle and/or the network service also includes a location tracking system that tracks, receives and/or determines a location of each light electric vehicle as they are used. In some examples, the location tracking system tracks the location information of the light electric vehicle in real-time or substantially real-time. In other examples, the location tracking system determines the location information of the light electric vehicle at periodic intervals (e.g., every minute, every five minutes, every ten minutes, etc.). In yet other examples, the location tracking system may track the location of the light electric vehicle in real-time or substantially real-time when the light electric vehicle is reserved, rented or otherwise used by an individual and may track location information at periodic intervals when the light electric vehicle has been reserved or is otherwise not in use.

The one or more computing systems of the network service also include one or more databases that store information about each of the light electric vehicles and/or the rechargeable battery kiosk(s) 150. For example, the one or more databases may store location information for each light electric vehicle and/or the rechargeable battery kiosk(s) 150, rechargeable battery status information for rechargeable batteries used by each light electric vehicle and/or in the rechargeable battery kiosk(s) 150, rechargeable battery kiosk information (e.g., the number of rechargeable batteries housed by the rechargeable battery kiosk 150), and/or light electric vehicle status information (e.g., how many times the light electric vehicle has been reserved, whether the light electric vehicle is damaged, whether the light electric vehicle should be serviced, etc.).

The one or more databases may also store information about the individual. This information may include a profile of the individual (e.g., username, contact information, etc.) security credentials of the individual (e.g., a password), historical usage data, payment information and the like. The one or more databases may also store information about the light electric vehicle including one or more results of a brake system inspection process.

The one or more computing systems of the network service may also include a matching system. The matching system receives, manages or otherwise handles various requests from the individual. The requests may include light electric vehicle rental requests and light electric vehicle reservation requests. For example, when a light electric vehicle use request is received from the client application executing on the individual's computing device, the matching system may communicate with the location tracking system and determine which light electric vehicle should be matched with or otherwise assigned to the requesting individual.

The one or more computing systems of the network service may also include a payment system that processes payment information of the individual and/or distributes received incentives to the individual. For example, when an individual rents and uses a light electric vehicle, the individual may be charged for the usage based on a duration of use and/or a travel distance. Once the individual has finished using the light electric vehicle (e.g., by arriving at her intended destination, a check-in point, a battery kiosk 150, etc.), the payment system may automatically process the payment information of the individual. Likewise, if the individual is offered an incentive (e.g., for parking the light electric vehicle in a certain location), the payment system may apply or otherwise provide the incentive to the individual.

As discussed above, the environment 100 includes one or more light electric vehicles including, but not limited to, an electric scooter 110 and an electric bicycle 130. In examples, the electric scooter 110 includes vehicle components (e.g., wheels, axles, baseboard, handlebar, braking mechanisms, etc.), one or more electric motors, control systems, sensors, speakers, and/or lights, which may be powered by a rechargeable battery. The rechargeable battery may be secured to the electric scooter 110 by a battery holster 120.

Likewise, and in some examples, the electric bicycle 130 includes vehicle components (e.g., wheels, axles, chains, gear ratios, bicycle seat, handlebar, bicycle frame, braking mechanisms, etc.), one or more electric motors, control systems, sensors, speakers, and/or lights, which may also be powered by a rechargeable battery. The rechargeable battery may be secured to the electric bicycle 130 by a battery holster 140.

The control system of the electric scooter 110 and/or the electric bicycle 130 may include a controller or control mechanism such as described herein. As such, the control system may manage the power output to the one or motors, provides a visual indication as to a charge level of the rechargeable battery in the battery holster 120, and/or communicates directly (e.g., via Wi-Fi, Bluetooth, etc.) or indirectly (e.g., via one or more remote computing devices, one or more networks, the Internet, etc.) with the computing device of the individual and/or with the network service.

Example communications include, but are not limited to, initiating locking or unlocking of the electric scooter 110 or the electric bicycle 130 (e.g., initiating or ending a travel session), initiating a battery swap to exchange a rechargeable battery in the battery holster 120 or the battery holster 140 with one in a rechargeable battery kiosk 150, determining a location and/or status information of the electric scooter 110 or the electric bicycle 130, and determining a location of a rechargeable battery and/or a rechargeable battery kiosk 150. Lights, speakers, and/or other output devices of the electric scooter 110 or the electric bicycle 130 may be used to provide an indication as to the location of the electric scooter 110 or the electric bicycle 130 or as an anti-theft mechanism, among other examples.

As shown in FIG. 1, each light electric vehicle includes a battery holster. For example, the battery holster 140 is affixed to the seat tube of the electric bicycle 130, while the battery holster 120 is illustrated as being affixed to the handlebar column of the electric scooter 110. It will be appreciated that the locations of the battery holsters 120 and 140 are provided as examples, and that a battery holster may be positioned in a variety of alternate locations in other examples. For example, the battery holster 140 may be affixed to the handlebar column or the cross bar of the electric bicycle 130. As another example, the battery holster 120 may be affixed to the deck or located near the rear of the electric scooter 110.

The battery holsters 120 and 140 are each operable to receive a rechargeable battery. For example, an individual may operate a light electric vehicle for a period of time and then determine that the rechargeable battery in use by the light electric vehicle needs to be recharged. In some instances, the light electric vehicle, or the rechargeable battery itself, may communicate current battery charge information for the rechargeable battery to the computing device of the individual. In another example, the rechargeable battery and/or battery holster 120 and 140 may include a visual indicator to display the charge level of the rechargeable battery. In yet another example, a control mechanism coupled to the light electric vehicle may include one or more indicators that reflect the charge level of the rechargeable battery. As an addition or an alternative, the electrical vehicle, the control mechanism and/or the rechargeable battery itself, may communicate current battery charge information for the rechargeable battery to the network service, which can provide battery information to the computing device of the individual. When this occurs, the individual may be directed to a rechargeable battery kiosk 150. For example, the network service can transmit data, over one or more networks, to the computing device and/or the control mechanism to cause the computing device and/or control mechanism to display information about a particular rechargeable battery kiosk 150 that individual could travel to in order to initiate a rechargeable battery exchange.

When the individual arrives at the rechargeable battery kiosk 150, the individual may exchange the light electric vehicle's current battery with another rechargeable battery housed by the rechargeable battery kiosk 150, thereby enabling the light electric vehicle to continue or resume operation. In some instances, the individual can use the client application executing on the computing device of the individual to locate and/or select a rechargeable battery kiosk 150, receive directions to the rechargeable battery kiosk 150, and initiate a rechargeable battery exchange with the rechargeable battery kiosk 150 when the individual arrives at its location. In another example, a selectable element (e.g., a button) on the control mechanism may enable the individual to initiate a rechargeable battery exchange.

According to examples, when the rechargeable battery exchange is initiated, the control system of the light electric vehicle may enable the rechargeable battery 160 to be removed from a battery holster, such as battery holster 120 or 140. The rechargeable battery 160 may then be exchanged for a different rechargeable battery 160 housed by the rechargeable battery kiosk 150. The rechargeable battery 160 may subsequently be inserted into the battery holster of the light electric vehicle.

The rechargeable battery kiosk 150 stores and charges a set of rechargeable batteries 160. Each rechargeable battery 160 in the set can be used by both the electric scooter 110 and the electric bicycle 130. In some examples, multiple rechargeable battery kiosks 150 are located within a city, county, or other geographic region. For example, one rechargeable battery kiosk may be located in or otherwise associated with a first geographic area within a geographic region and another rechargeable battery kiosk may be located in or otherwise associated with a second geographic area within the geographic region.

Thus, when an individual is traveling through the geographic region on an light electric vehicle and wants or needs to exchange the light electric vehicle's current rechargeable battery for one that has more charge, the individual may be directed (e.g., via the client application executing on the individual's computing device) to the rechargeable battery kiosk 150 associated with the geographic region. When the individual arrives at the rechargeable battery kiosk 150, the individual can exchange their current rechargeable battery for one that is fully charged or substantially fully charged. This enables the individual to travel using a light electric vehicle across distances that may otherwise not be possible using the power provided by one charge of a rechargeable battery.

In some examples, the rechargeable battery kiosk 150 comprises a control system that communicates directly or indirectly with a computing device of the individual and/or the control mechanism of the light electric vehicle when performing the rechargeable battery exchange such as described above. In some examples, the control system communicates with a remote computing device(s), e.g., that implements the network service, using a connection to one or more networks, such as a Wi-Fi network and/or a cellular network. The rechargeable battery kiosk 150 may receive and/or report rechargeable battery status information to a remote computing device(s). The battery status information can include, but is not limited to, battery charge levels, battery health, an amount of rechargeable batteries currently available at the rechargeable battery kiosk, and/or usage demand statistics.

Figure 2:
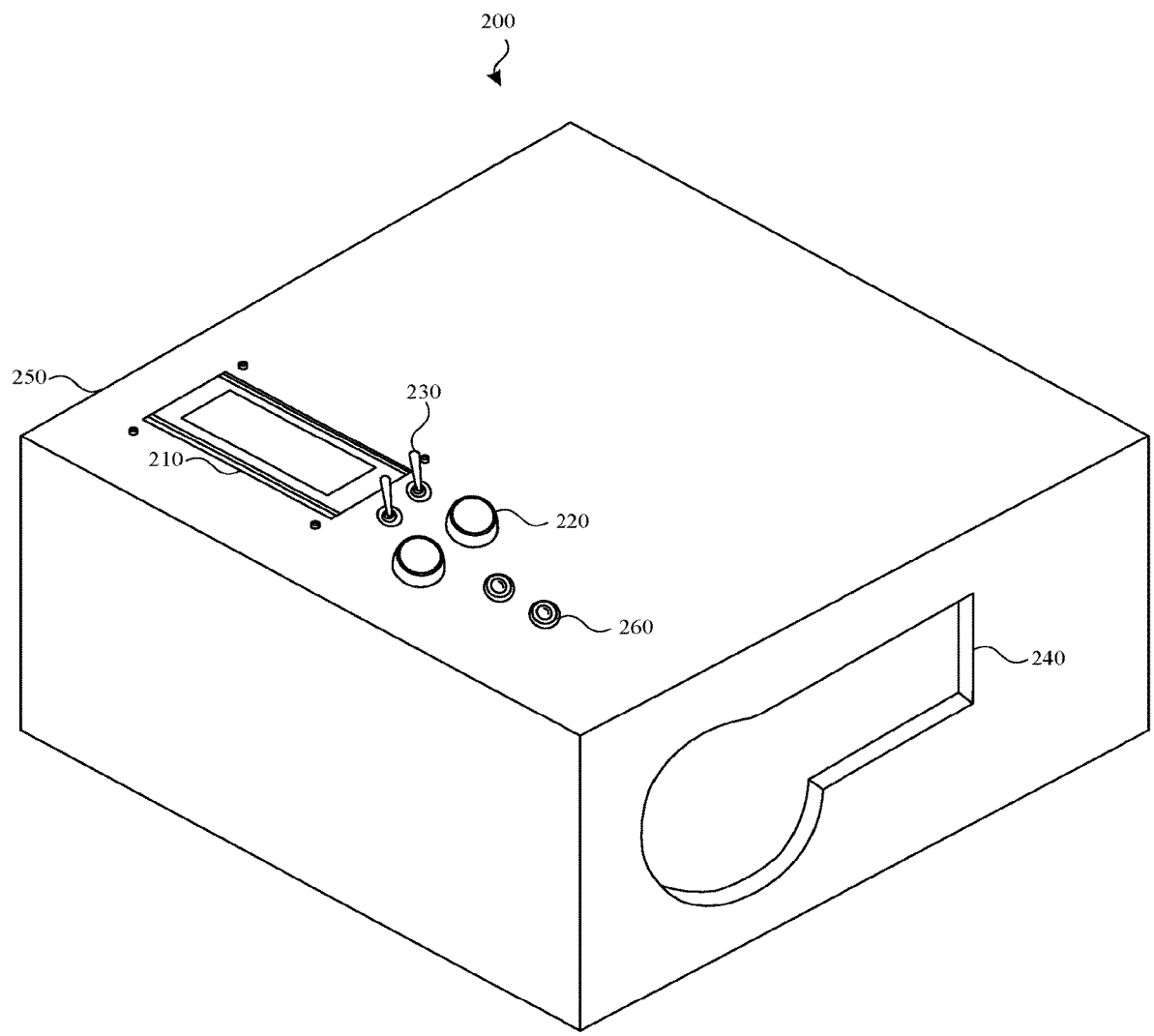
FIG. 2 illustrates a light electric vehicle brake inspection device according to one or more examples.

FIG. 2 illustrates a light electric vehicle brake inspection device 200 according to one or more examples. The light electric vehicle brake inspection device 200 may be portable or stationary and may be used to check a brake system of a light electric vehicle such as, for example, electric scooter 110 (FIG. 1) and the electric bicycle 130 (FIG. 1). Although light electric vehicles are specifically shown and mentioned, the light electric vehicle brake inspection device 200 may be used to check any mechanical braking system that has a brake lever to activate a brake system.

The light electric vehicle brake inspection device 200 includes a display 210, a first set of input mechanisms 220, a second set of input mechanism 230 and one or more output mechanisms 260. The display 210 may be used to display information about the light electric vehicle being tested, the results of the brake system inspection process and/or other information about the light electric vehicle as the information is being provided to the light electric vehicle brake inspection device 200.

For example, prior to beginning the brake system inspection process or test, identification information (e.g., a serial number or other identifying information) associated with the light electric vehicle may be provided to the light electric vehicle brake inspection device 200 using the first set of input mechanisms 220 and/or the second set of input mechanisms 230.

In examples in which a serial number of the light electric vehicle is provided to the light electric vehicle brake inspection device 200, the second set of input mechanisms 230 may be used to toggle through digits, letters or other characters and the first set of input mechanisms 220 may be used to select the displayed character thereby allowing the individual to accurately and easily provide the identification information to the light electric vehicle brake inspection device 200. Once the information associated with the light electric vehicle has been provided to the light electric vehicle brake inspection device 200, one or more of the first input mechanisms 220 or the second set of input mechanisms 230 may be selected to begin the brake system inspection process.

Although FIG. 2 shows that the first set of input mechanisms 220 are buttons and the second set of input mechanisms 230 are a switches, a variety of input mechanisms may be used including, but not limited to, one or more buttons, a keyboard, a mouse, a touch/force input device, an image sensor and so on.

The output mechanisms 260 may include one or more lights that display a status of the light electric vehicle brake inspection device 200 (e.g., a green light and/or a red light for indicating whether the light electric vehicle brake inspection device 200 is ready to begin the brake system inspection process) and/or whether the brake system being checked has passed or failed the brake system inspection process. For example, once the identification information of the light electric vehicle has been provided to the light electric vehicle brake inspection device 200, a green light may be illuminated indicating that the brake system inspection process can proceed. If the brake system of the light electric vehicle passes the test, the green light may remain illuminated. However, if the brake system of the light electric vehicle fails the test, a red light may be illuminated.

The light electric vehicle brake inspection device 200 also includes a housing 250 that encloses various components of the light electric vehicle brake inspection device 200. These components will be shown and further described below with reference to FIG. 3. The housing 250 also defines an opening 240 that receives a handlebar and brake lever of the light electric vehicle. Once the handlebar and brake lever of the light electric vehicle have been received into the opening 240, the light electric vehicle brake inspection device 200 may begin the brake system inspection process.

In some examples, the light electric vehicle brake inspection device 200 includes a sensor that indicates whether the handlebar and brake lever have been correctly and/or completely inserted into the opening 240 of the light electric vehicle brake inspection device 200. The light electric vehicle brake inspection device 200 may also provide an indication, using the one or more output mechanisms 260, as to whether the handlebar and brake lever have been inserted correctly/completely in the opening 240.

For example, the light electric vehicle brake inspection device 200 may cause the one or more output mechanisms 260 to output a green light or red light depending on whether the sensor detects whether the handlebar and brake lever have been correctly inserted into the opening 240. The light electric vehicle brake inspection device 200 may prevent the brake system inspection process from beginning until it is determined that the handlebar and brake lever have been correctly inserted and/or until the one or more output mechanisms indicate that the brake system inspection process can begin (e.g., by illuminating a green light).

Figure 3:
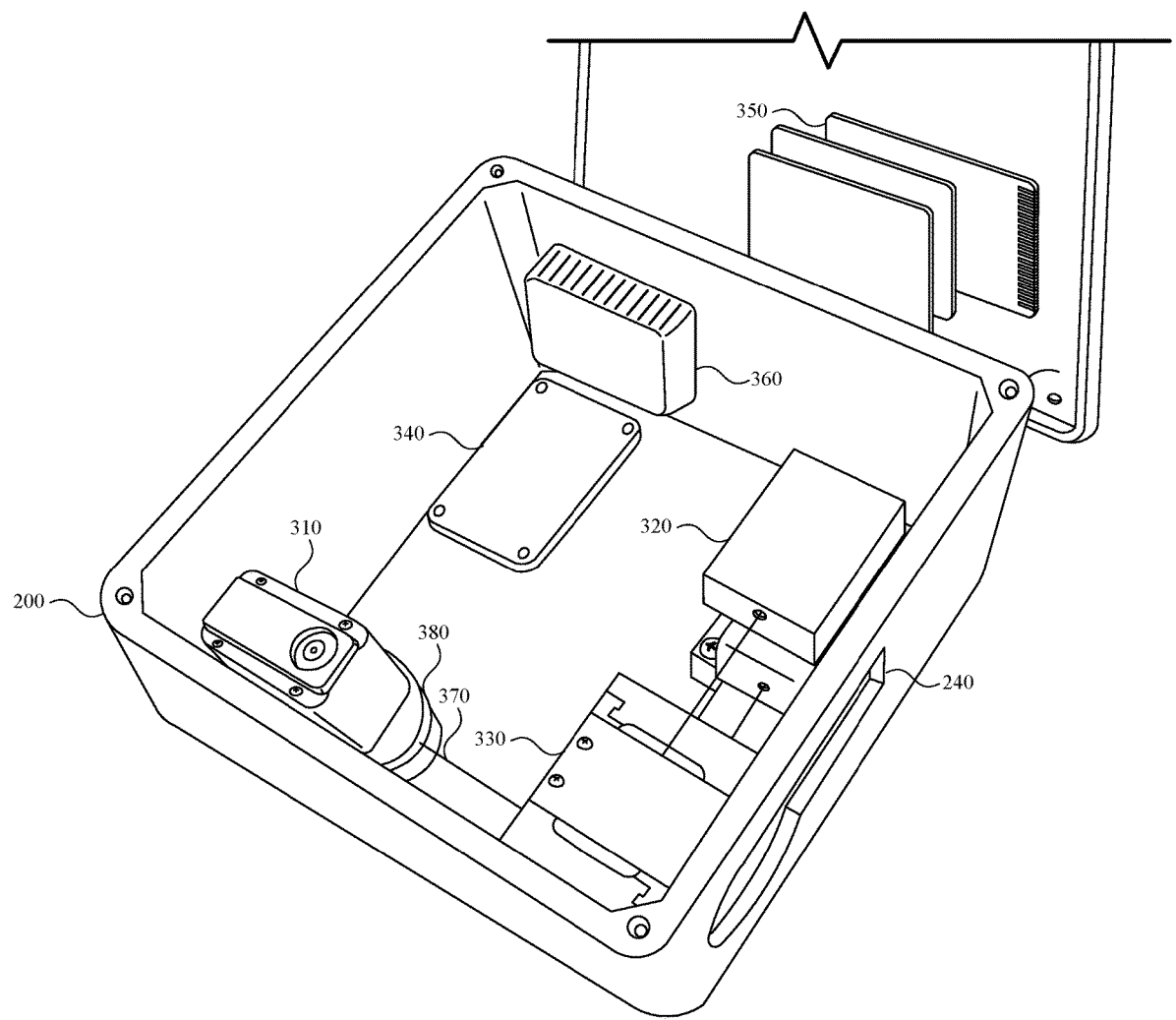
FIG. 3 illustrates examples components of the light electric vehicle brake inspection device shown in FIG. 2 according to one or more examples.

FIG. 3 illustrates examples components of the light electric vehicle brake inspection device 200 shown in FIG. 2 according to one or more examples. As shown in FIG. 3, the light electric vehicle brake inspection device 200 may include a motor 310, a sliding mechanism 320 and a load cell 330.

Once the handlebar and brake lever have been inserted in to the opening 240, the motor 310 causes the sliding mechanism 320 to move (e.g., using a cable 370 and pulley 380 system) from a first position to a second position. As the sliding mechanism 320 moves, it actuates the brake lever to a first distance from a datum. The load cell 330 measures the amount of force that is applied to the brake lever and/or the amount of opposing force that is applied to brake lever. For example, for every X newton(s) of force that is applied to the brake lever by the sliding mechanism 320, the load cell 330 should measure Y newton(s) of opposing force to ensure that the brake system is operating as expected. In some examples, the sliding mechanism 320 may be or otherwise be activated by a pneumatic mechanism, an electromagnetic mechanism, a mechanical mechanism and the like.

In some examples, the motor 310 is configured to measure the linear distance the brake lever has traveled when it has been actuated. This may be accomplished by measuring the rotation of the motor and/or the pulley 380. Once the load cell 330 has measured the amount of force, a load cell amplifier 360 may convert the output from the load cell 330 into an output that is understandable by the technician. This measurement may then be provided on a display of the light electric vehicle brake inspection device 200.

The light electric vehicle brake inspection device 200 may also include a battery 340 a processor 350, and a storage device. The light electric vehicle brake inspection device 200 may also include a storage device that stores information about the light electric vehicle and the results of the brake system inspection process. In some examples, the light electric vehicle brake inspection device 200 may also communicate or otherwise send the results of the brake system inspection process to a remote system.

In some examples, the motor 310 and load cell 330 may be configured to take a number of different measurements when the brake lever has traveled a number of different distances from a datum. For example, a first measurement may be taken by the load cell 330 when the motor 310 has caused the brake lever to move a first distance from the datum and a second measurement may be taken by the load cell 330 when the motor has caused the brake lever to move a second distance from the datum. The first distance may be a point at which one or more components of the brake system initially contact a portion of the light electric vehicle (e.g., a brake pad or other portion of the brake system contacts a brake disk or brake drum. of the light electric vehicle) and the second distance may be a point at which a maximum brake has been applied or when the brake lever has caused movement of the brake disk or brake drum a maximum distance.

Once the measurements have been received or otherwise calculated, the processor 350 may compare the received measurements with expected measurements to determine whether the brake system of the light electric vehicle is operating as expected such as described above.

In some examples, the light electric vehicle brake inspection device 200 may be communicatively coupled to or otherwise receive information from various sensors positioned on the light electric vehicle. For example, the light electric vehicle may include a load sensor, a pressure sensor, and/or a stress or strain sensor on various braking components of a brake system of a light electric vehicle.

In one particular example, a pressure or strain sensor may be placed on or otherwise associated with a cable and/or brake pad of the brake system and configured to measure the pressure that is applied against a brake disk. In another example, a pressure sensor may be placed or otherwise associated with a brake pad and/or brake caliper while a strain sensor may be placed on or otherwise associated with the brake cable. As the light electric vehicle brake inspection device 200 executes the brake inspection process described above, one or more of the readings from these sensors may be used, solely or in combination with the readings from the load cell 330, to determine whether the brake system of the light electric vehicle is operating as expected.

In some examples, the expected force readings may be unique or otherwise tailored to each light electric vehicle. For example, due to manufacturing tolerances, a first light electric vehicle may have a first expected force reading while a second light electric vehicle may have a second expected force reading. In such examples, the light electric vehicle brake inspection device 200 may be configured to communicate with a remote system and determine (based on an identifier associated with the light electric vehicle) expected force readings for a particular light electric vehicle.

In other examples, the expected force readings may be based, at least in part, on a rider profile (e.g., weigh, height, riding experience) and/or based on weather conditions (e.g., wet or dry road conditions).

Figure 4A:
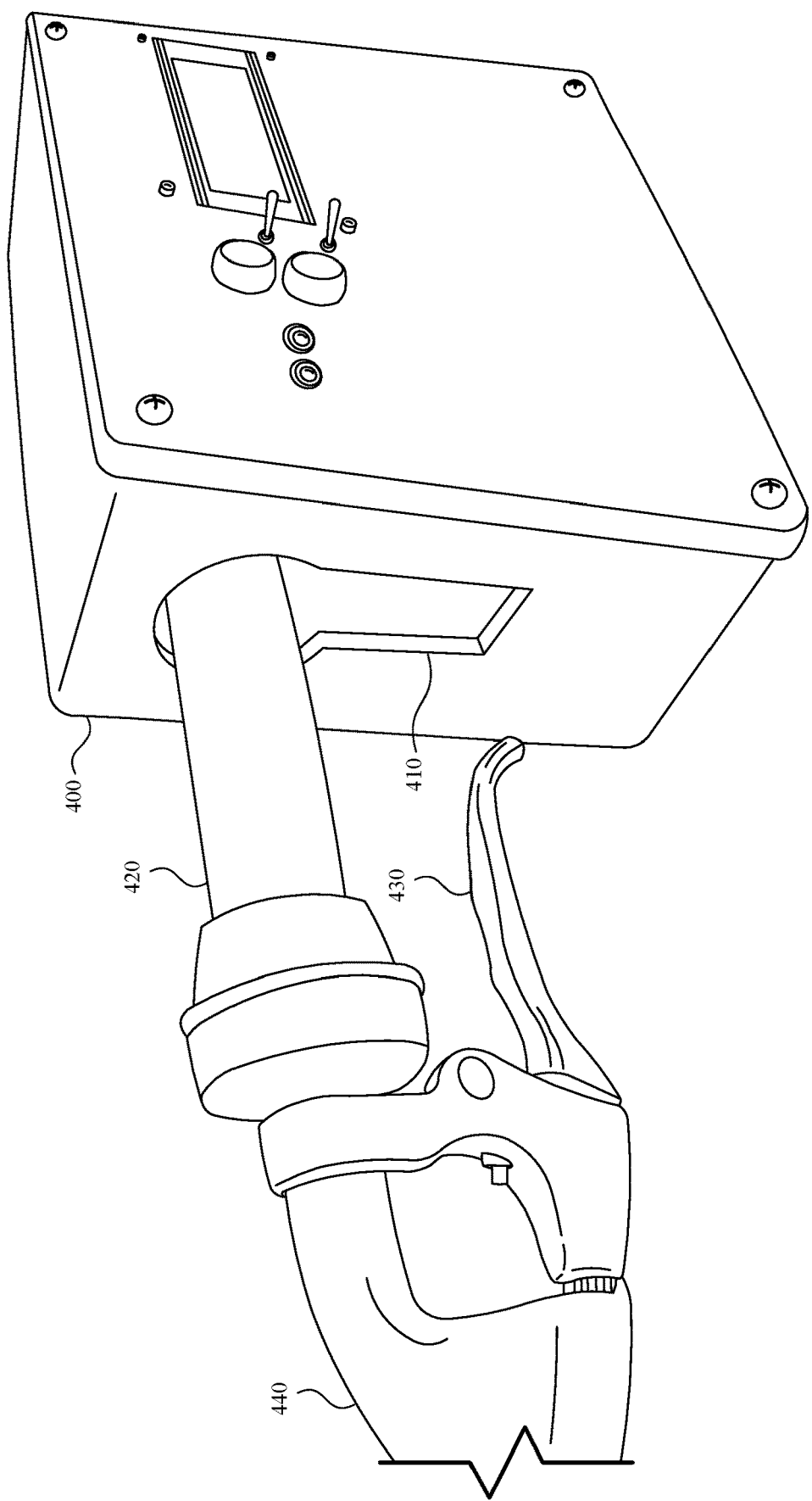
FIGS. 4A-4B illustrate a handlebar and a brake lever of a light electric vehicle being received into a light electric vehicle brake inspection device according to one or more examples.
Figure 4B:
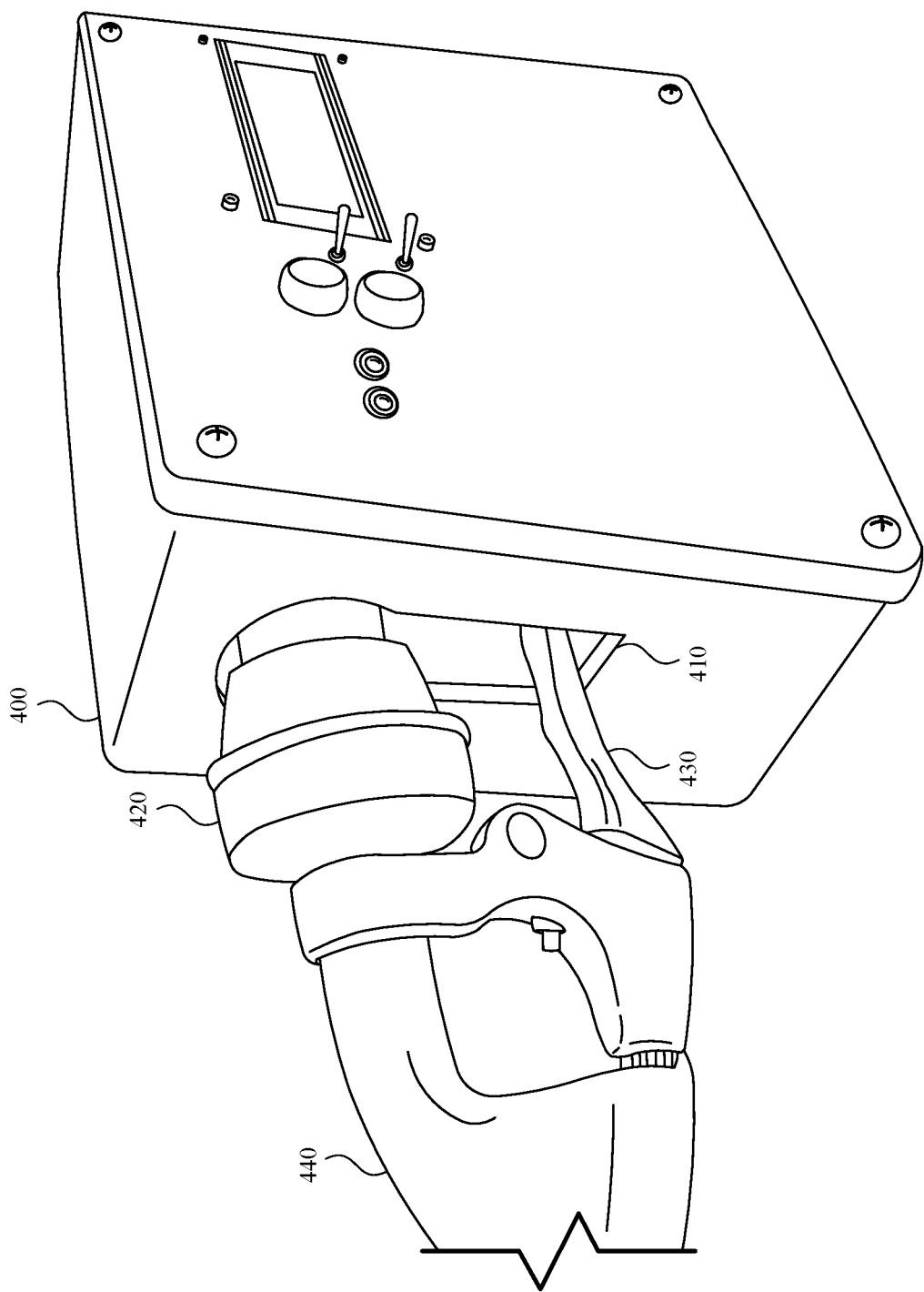

FIGS. 4A-4B illustrate a handlebar 420 and a brake lever 430 of a light electric vehicle 440 being received into an opening 410 of a light electric vehicle brake inspection device 400 according to one or more examples. More specifically, FIG. 4A illustrates the handlebar 420 and brake lever 430 being inserted into the light electric vehicle brake inspection device 400. FIG. 4B illustrates the handlebar 420 and brake lever 430 being fully inserted into the light electric vehicle brake inspection device 400.

Figure 5A:
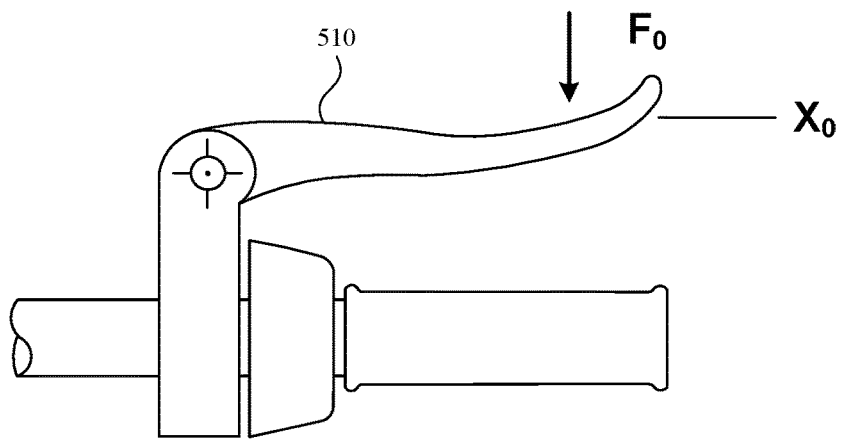
FIGS. 5A-5C illustrate example distances a brake lever may travel from a datum when actuated according to one or more examples.
Figure 5B:
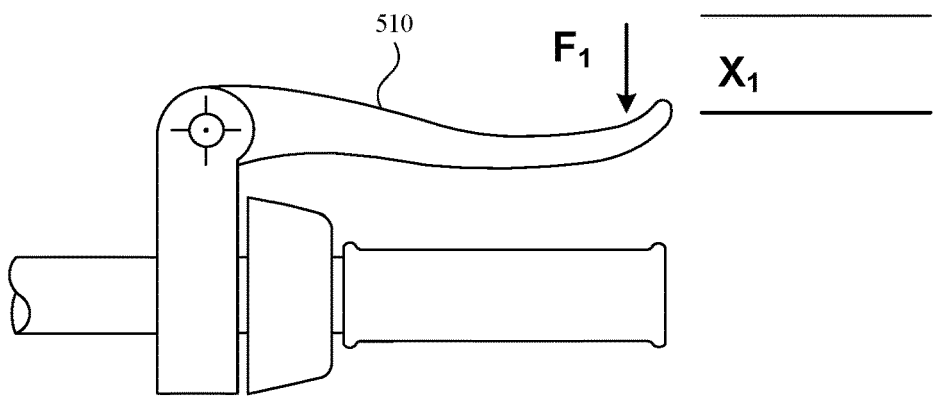
Figure 5C:
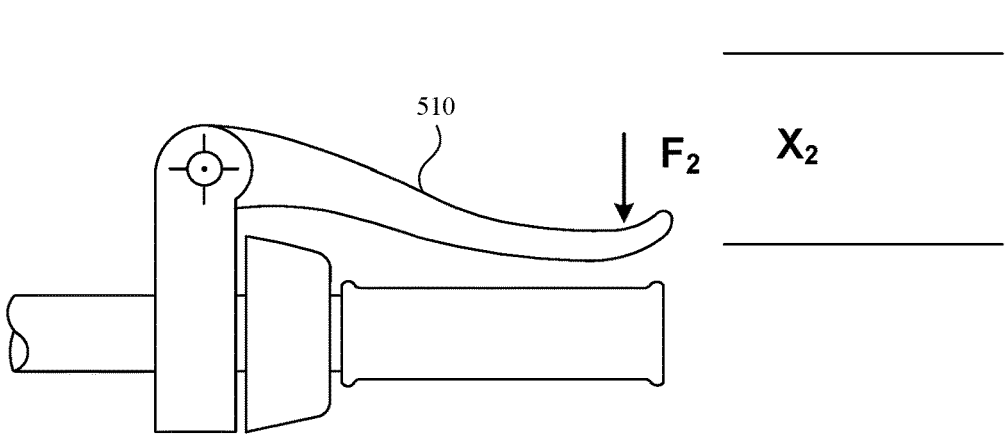

FIGS. 5A-5C illustrate a distance a brake lever 510 travels from a datum when actuated according to one or more examples. For example, in FIG. 5A, the brake lever 510 is in its initial state (e.g., a force has not been applied). In FIG. 5B, the brake lever has moved a first distance (X1) from a datum. In some examples, the first distance is a point at which a portion of the brake system makes initial contact with a brake disk or brake drum of the light electric vehicle. If a force measurement were to be taken at this point, the actual force measurement may be compared against an expected force measurement to determine whether the brake system is operating as expected.

FIG. 5C illustrates a second distance (X2) the brake lever 510 has traveled from a datum. In some examples, the second distance X2 represents a maximum brake being applied by the brake system of the light electric vehicle. If a force measurement were to be taken at this point by the light electric vehicle brake inspection device, the actual force measurement may be compared against an expected force measurement to determine whether the brake system is operating as expected.

Figure 6:
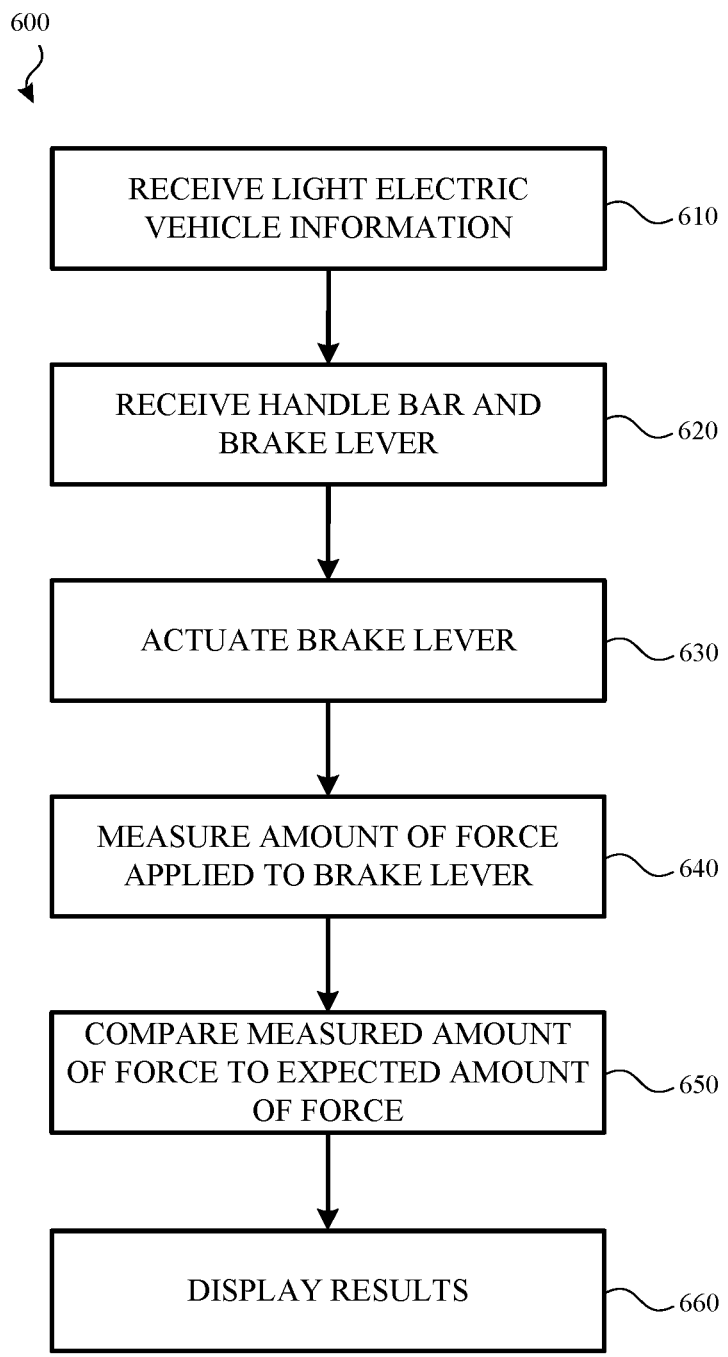
FIG. 6 illustrates a method for checking a brake system of a light electric vehicle according to one or more examples.

FIG. 6 illustrates a method 600 for checking a brake system of a light electric vehicle according to one or more examples. In some examples, the method 600 may be performed by a light electric vehicle brake inspection device such as, for example, the light electric vehicle brake inspection device 200 (FIG. 2) shown and described herein.

Method 600 begins when light electric vehicle information is received by the light electric vehicle brake inspection device. In some examples, the light electric vehicle information is a serial number of the light electric vehicle or some other identifying characteristic of the light electric vehicle. The light electric vehicle information may be provided to the light electric vehicle brake inspection device using one or more input mechanisms such as previously described.

Once the light electric vehicle information has been provided to the light electric vehicle brake inspection device, the light electric vehicle brake inspection device receives (620) a handlebar and brake lever into an opening defined by a housing of the light electric vehicle brake inspection device.

The light electric vehicle brake inspection device may then proceed with the brake system inspection process by actuating (630) the brake lever. In some examples, the brake lever is actuated using a motor and a sliding mechanism such as previously described.

When the brake lever is actuated, the light electric vehicle brake inspection device measures (640) the amount of force applied to the brake lever and/or an opposing force provided on the brake lever or other component of the brake system. The light electric vehicle brake inspection device may then compare (650) the measured amount of force to an expected amount of force to determine whether the brake system is operating as expected. The light electric vehicle brake inspection device may then display (660) the results of the of the brake system inspection process on a display of the light electric vehicle brake inspection device.

Figure 7:
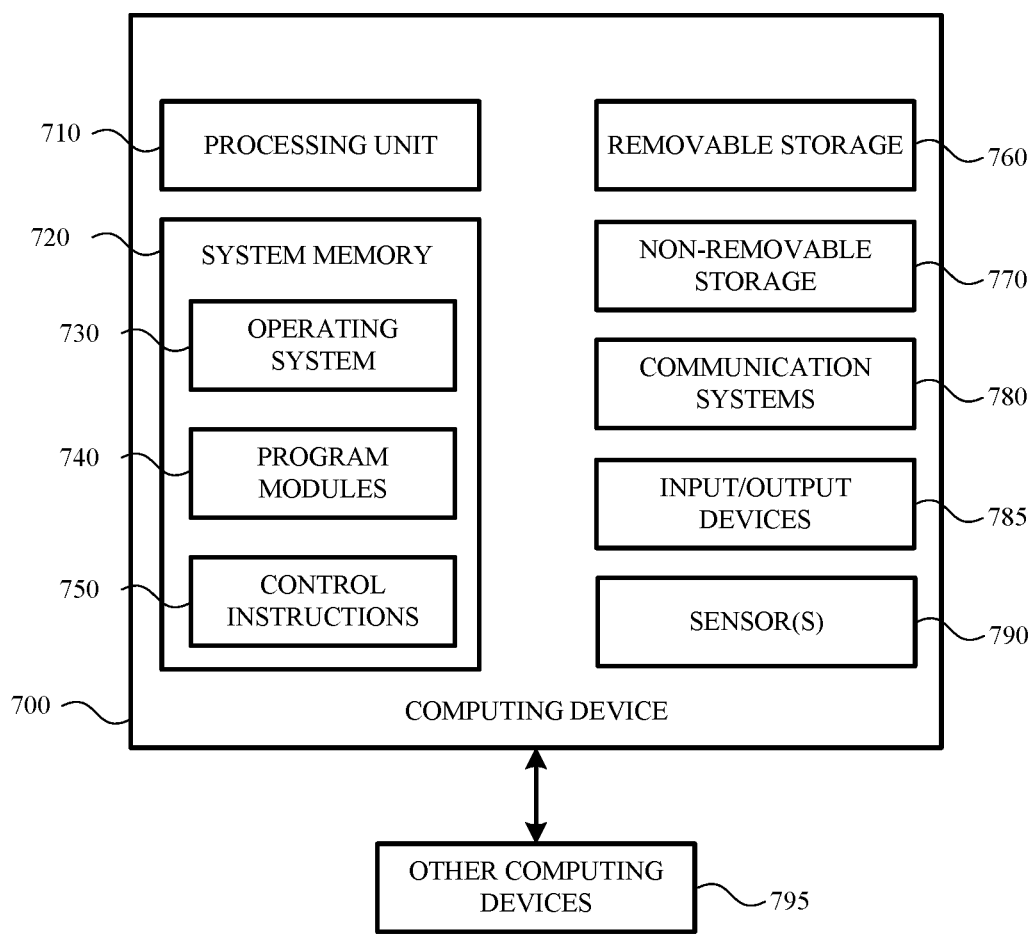
FIG. 7 is a system diagram of a computing device that may be integrated or otherwise associated with a light electric vehicle brake inspection device and/or a light electric vehicle according to one or more examples.

FIG. 7 is a system diagram of a computing device 700 according to an example. The computing device 700 may be integrated with or associated with a light electric vehicle and/or the light electric vehicle brake inspection device described herein. As shown in FIG. 7, the physical components (e.g., hardware) of the computing are illustrated and these physical components may be used to practice the various aspects of the present disclosure.

The computing device 700 may include at least one processing unit 710 and a system memory 720. The system memory 720 may include, but is not limited to, volatile storage (e.g., random access memory), non-volatile storage (e.g., read-only memory), flash memory, or any combination of such memories. The system memory 720 may also include an operating system 730 that controls the operation of the computing device 700 and one or more program modules 740. The program modules 740 may be responsible for gathering or determining expected force readings, light electric vehicle information and the like. The memory may also store and/or provide system control instructions 750 that cause the motor of the light electric vehicle brake inspection device to actuate the brake lever such as described. A number of different program modules and data files may be stored in the system memory 720. While executing on the processing unit 710, the program modules 740 may perform the various processes described above.

The computing device 700 may also have additional features or functionality. For example, the computing device 700 may include additional data storage devices (e.g., removable and/or non-removable storage devices) such as, for example, magnetic disks, optical disks, or tape. These additional storage devices are labeled as a removable storage 760 and a non-removable storage 770.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 7 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 700 on the single integrated circuit (chip). The disclosure may also be practiced using other technologies capable of performing logical operations such as, for example, AND, OR, and NOT, including but not limited to mechanical, optical, fluidic, and quantum technologies. In addition, examples of the disclosure may be practiced using a computing device associated with or integrated with the electric vehicle and/or in any other circuits or systems.

The computing device 700 may include one or more communication systems 780 that enable the electric vehicle to communicate with rechargeable batteries, other computing devices 795, a network service and the like. Examples of communication systems 780 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 700 may also have one or more input devices and/or one or more output devices shown as input/output devices 785. These input/output devices 785 may include a keyboard, buttons, switches, a sound or voice input device, haptic devices, a touch, force and/or swipe input device, a display, speakers, etc. The aforementioned devices are examples and others may be used.

The computing device 700 may also include one or more sensors 790. The sensors may be used to detect or otherwise provide information about the operating condition of the computing device 700. In other examples, the sensors 790 may provide information about a light electric vehicle and/or whether the light electric vehicle brake inspection device is operating correctly and/or is being used correctly via Diagnostics Trouble Code DTCs (e.g., sensors sending signals to the CAN-bus indicating whether the handlebar and brake lever are correctly/completely inserted into the light electric vehicle brake inspection device).

The term computer-readable media as used herein may include computer storage media. Computer storage media may include volatile and nonvolatile, removable and non-removable media implemented in any method or technology for storage of information, such as computer readable instructions, data structures, or program modules.

The system memory 720, the removable storage 760, and the non-removable storage 770 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
receiving, via a receptacle defined by a housing of a light electric vehicle brake inspection device, at least a portion of a handlebar of the light electric vehicle and a brake lever of a brake system of the light electric vehicle;
actuating the brake lever to a first distance from a datum;
measuring an amount of force applied to the brake lever as the brake lever is displaced to the first distance; and
determining, based on a comparison of the amount of force applied to the brake lever to an expected amount of force, an operating status of the brake system of the light electric vehicle.

2. The method of claim 1, further comprising:
actuating the brake lever to a second distance from the datum, wherein the second distance is different from the first distance.

3. The method of claim 2, further comprising:
measuring a second amount of force applied to the brake lever as the brake lever is displaced to the second distance.

4. The method of claim 3, further comprising:
determining, based on a comparison of the second amount of force applied to the brake lever to a second expected amount of force, an operating status of the brake system of the light electric vehicle.

5. The method of claim 1, wherein the expected amount of force is associated with a rider profile.

6. The method of claim 1, further comprising:
displaying the operating status of the brake system of the light electric vehicle on a display of the light electric vehicle brake inspection device.

7. The method of claim 1, further comprising:
receiving, via one or more input mechanisms on the light electric vehicle brake inspection device, identification information associated with the light electric vehicle.

8. The method of 7, further comprising:
correlating the identification information associated with the light electric vehicle with the operating status of the brake system of the light electric vehicle; and
transmitting the identification information and the operating status of the brake system of the light electric vehicle to a remote computing device.

9. A light electric vehicle brake inspection device, comprising:
a processor;
a memory storing information associated with a light electric vehicle;
a housing defining an opening configured to receive a handlebar and brake lever of the light electric vehicle;
a motor that activates a sliding mechanism to actuate the brake lever to a first distance from a datum; and
a load cell that measures an amount of force applied to the brake lever as the brake lever is displaced to the first distance.

10. The light electric vehicle brake inspection device of claim 9, further comprising:
one or more input mechanisms configured to receive identification information associated with the light electric vehicle.

11. The light electric vehicle brake inspection device of claim 9, further comprising:
   a display outputting a result of a brake system inspection process.

12. The light electric vehicle brake inspection device of claim 9, further comprising:
   a visual indicator outputting a result of a brake system inspection process.

13. The light electric vehicle brake inspection device of claim 9, wherein the motor further activates the sliding mechanism to actuate the brake lever to a second distance from the datum, wherein the second distance is different from the first distance.

14. The light electric vehicle brake inspection device of claim 13, wherein the load cell measures a second amount of force applied to the brake lever as the brake lever is displaced to the second distance.

15. The light electric vehicle brake inspection device of claim 14, wherein the processor determines, by comparison of one or more of the first amount of force applied to the brake lever and the second amount of force amount of force applied to the brake lever with an expected amount of force at each of the first and second distances, an operating status of the brake system of the light electric vehicle.

* * * * *